March 20, 1951     A. G. PERKINS ET AL     2,545,857
CONTROL DEVICE FOR MILKING MACHINES
Filed Jan. 7, 1948     2 Sheets-Sheet 1
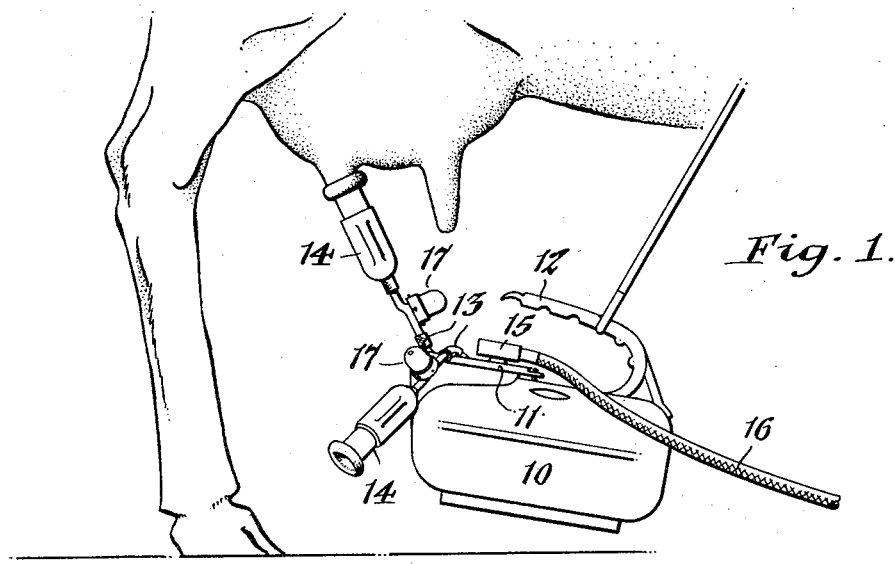
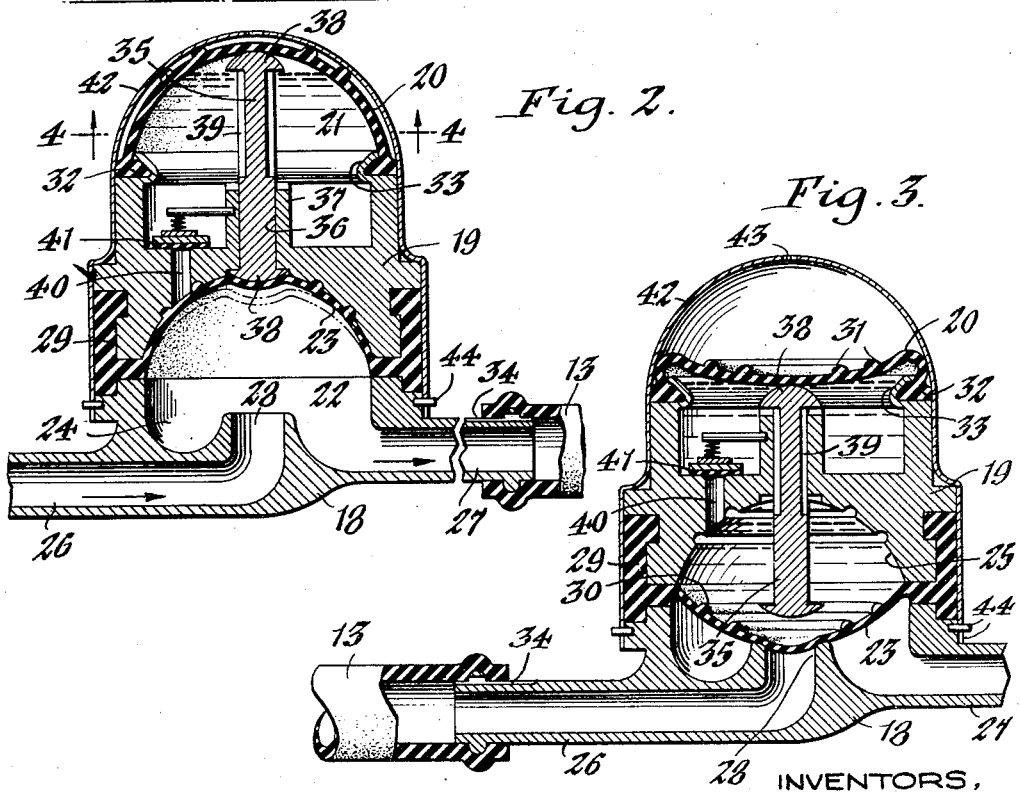
INVENTORS,
Albert G. Perkins,
Warren E. Perkins,
BY Walter P. Geyer
ATTORNEY.

March 20, 1951 — A. G. PERKINS ET AL — 2,545,857
CONTROL DEVICE FOR MILKING MACHINES
Filed Jan. 7, 1948 — 2 Sheets-Sheet 2
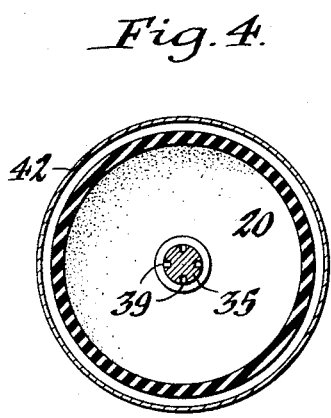
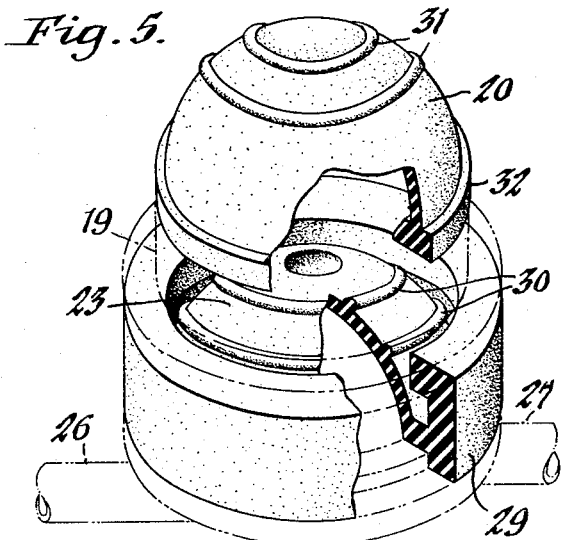
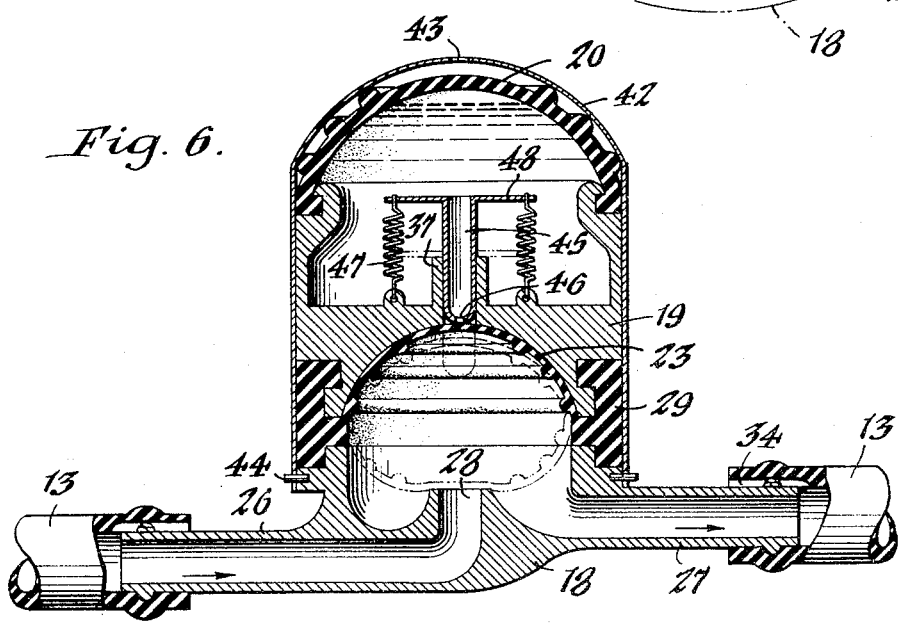
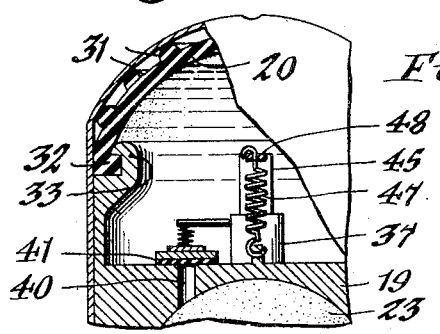
INVENTORS,
Albert G. Perkins,
Warren E. Perkins,
BY Walter P. Geyer
ATTORNEY.

UNITED STATES PATENT OFFICE 2,545,857

CONTROL DEVICE FOR MILKING MACHINES

Albert G. Perkins and Warren E. Perkins,
Grand Island, N. Y.

Application January 7, 1948, Serial No. 962

12 Claims. (Cl. 31—86)

This invention relates generally to milking machines or milkers but more particularly to control devices for use in conjunction therewith for causing the automatic release of the teat cups from the cow as the respective quarters of the cow's bag are milked out.

One of the objects of the invention is to provide a control unit for interposition in the teat cup connections of a milker which is so designed and constructed as to automatically cause the teat cups to drop from the cow as the companion quarters of the bag are milked out, and thereby not only save the time and attention of the attendant, but assure the proper and quick milking of the cow without the danger resulting from leaving the milking machine on the cow for too long a period.

Another object is to provide a control device of this character which is simple and compact in construction, which embodies a minimum number of parts, and which is positive and reliable in operation to cause the dropping of each teat cup from the cow as she is milked out.

Other features of the invention reside in the construction and arrangement of parts hereinafter described and particularly pointed out in the appended claims.

In the accompanying drawings—

Figure 1 is a side view of a milking machine suspended in operative relation to the cow and showing our control device in the teat cup connections thereof. Figure 2 is an enlarged vertical section of one of the control units in its normal milk-flow position. Figure 3 is a similar view with the parts in a nonflow or shut-off position, and in which position the companion teat cup automatically drops from the cow. Figure 4 is a horizontal section taken on line 4—4, Figure 2. Figure 5 is an exploded perspective view of the upper and lower diaphragms of the control device. Figure 6 is a vertical section of a modification of such device. Figure 7 is a fragmentary section, at right angles to Figure 6, showing the control valve and associated parts.

Similar characters of reference indicate corresponding parts throughout the several views.

By way of example, we have shown our teat-dropping control device or controlled quarter milker applied to a well known type of pulsating milking machine, wherein 10 indicates the milk-receiving can having a cover 11 and bail 12, the cover having milk-intake tubes radiating therefrom and each connected by a flexible conduit or hose connection 13 having a teat cup 14 at its free end for detachable connection to one of the cow's teats. Also applied to the cover is the customary pulsator 15 which is connected by a hose 16 to the suction source. Interposed in each hose connection 13 is one of our control units, indicated generally by the numeral 17, through which the milk flows from the cow to the can, and which functions, as each quarter of the cow's bag is milked out, to automatically shut off the vacuum thereto and cause the companion teat cup to drop from the cow, as depicted in Figure 1, thereby preventing injury to the cow from over-milking.

In the embodiment of the invention shown in Figures 1–5, each control unit consists of a hollow or multi-compartment body composed of a lower section 18, an intermediate partition-forming section 19 and deflatable top section 20 of rubber or like flexible material, the intermediate section dividing the body into upper and lower compartments 21 and 22, the upper compartment constituting a fluid chamber and being normally filled with a constant viscosity liquid, and the lower compartment having a deflatable diaphragm 23 therein of rubber or like flexible material for defining a lower chamber 24 in milk flow communication with the companion teat connection 13 and an upper chamber 25 adapted for operative communication with the upper fluid compartment. These several sections are axially-alined, as shown in Figures 2 and 3, and the lower body-section 18 has nipples 26 and 27 projecting from its opposite sides to which the intake and outlet branches of the companion milk flow conduit 13 are connected and whereby the milk drawn from the cow by the vacuum of the machine flows through such section and then to the can. The intake nipple 26 terminates in a port 28 opening upwardly and centrally into this lower body-section, and the diaphragm 23 is adapted to automatically respond to variations of vacuum in to assume the normal milk flow position shown in Figure 2 or the deflated position across such port 28 to shut off the vacuum to the companion teat cup and cause the latter to drop off the cow when the surge of milk from that quarter of the cow's bag is reduced to a minimum. The diaphragm is pre-formed or molded in substantially semi-spherical shape and the lower face of the intermediate or partition section 19 is of complemental concave shape whereby the former normally rests in contiguous relation with the latter, and at its outer edge this diaphragm has an attaching collar 29 which serves to detachably connect it to the companion sections 18, 19. On its upper surface this diaphragm has one or more annular beads or ridges 30 which promote its proper and central displacement axially of the body. The deflatable top section 20 is also pre-formed or molded in substantially semi-spherical shape and has annular beads or ridges 31 thereon which tend to centralize its displacement axially of the body. At its lower end this top section has an attaching collar 32 which is detachably engaged in seal-proof fashion with a retaining flange 33 applied to the upper end of the intermediate section 19. This top section is adapted, like the diaphragm 23, to automatically respond to variations of vacuum and normally assumes the inflated position shown in Figure 2, and when the companion quarter of the cow's bag is milked out it assumes, and jointly with the diaphragm, the deflated position shown in Figure 3.

Vent passages 34 of capillary-like dimensions are provided in the conduit-attaching portions of the nipples 26, 27 to properly vent or introduce atmosphere into the conduit and lower compartment 22 of the control unit 17 after the companion quarter of the cow's bag is milked out to permit the corresponding teat cup 14 to drop from the cow and the displaced parts of the control unit to return to their initial or normal positions.

The intermediate section 19 defining the fluid chambers 21, 25 is provided centrally thereof with an axially displaceable ported member 35 disposed between and in governed endwise-abutting relation to the dome-shaped, deflatable top section 20 and the diaphragm 23. This ported member is in the form of a stem or plunger guided in an opening 36 formed in a collar 37 rising from the intermediate section and the fit of this member in its guide opening is such that a capillary-like vent is provided between the two fluid chambers to permit a slow leakage of the fluid therethrough. The upper and lower ends of the ported stem have convex heads 38 thereon which abut the opposing surfaces of the top section and the diaphragm and which also provide resulting opposing shoulders for limiting the vertical displacement of the stem. In the surface of its upper portion this stem has longitudinal ports or by-pass grooves 39 which serve to establish free flow communication of the fluid from the upper chamber 21 into the lower chamber 25 when the stem is lowered to a position to cause such ports to bridge the guide-opening 36, as shown in Figure 3, to thereby result in a prompt and smart collapse of the diaphragm 23 to a position across the milk intake port 18. The upper face of the guide collar 37 has radial grooves therein so that in the lowered position of the stem 35 with its upper head abutting said collar, its ports are not shut off but fluid communication is maintained between the adjoining chambers 21, 25 so that as the diaphragm is automatically restored to its initial position the fluid will accordingly reverse its flow from the lower chamber 25 into the upper chamber 21 and the top section 20 will simultaneously be restored to its inflated condition. A second fluid by-pass or port 40 is provided in the partition section 19 which is normally yieldingly closed by a downwardly-closing check valve 41, but which is adapted to open in response to the restoring movements of the parts 21, 25 to their initial positions and thereby accelerate such movements.

A cap or cover 42 having a vent opening 43 in its top is detachably applied to each control unit and it may be held thereon by a bayonet joint 44 or the like.

In Figures 6 and 7 we have shown a modified form of the displaceable ported member or traveling port, consisting of a tube-like member 45 axially guided in the intermediate section 19 in a manner to define a capillary-like vent as in the previous construction and opening at its upper end into the fluid chamber 21 and having a port 46 at its lower end normally closed by the contiguous portion of the diaphragm 23. Springs 47 connected at one end to a cross arm 48 applied to the upper end of the ported member and at their opposite ends to the intermediate section serve to normally urge such member into sealing contact with the diaphragm, and during the collapse of the latter to its shut off position across the port 28 the downward movement of the ported member is arrested by such arm abutting the guide collar 37, as shown by dotted lines in Figure 6.

In operation, each control unit operates independently to shut off the vacuum to the companion teat cup when the companion quarter of the cow's bag is milked out, and at such time there is a vacuum differential created in the unit which causes its parts to assume the position shown in Figure 3 with the diaphragm 23 closed across the port 28 to shut off the vacuum to the teat cup and allow the latter to drop from the cow, as depicted in Figure 1, with the hose 13 thereof bent across the open end of its companion cover intake tube. During the normal milking operation with the milk surging through the lower compartment 22 of the unit and thence into the pail 10, the deflatable parts 20, 23 and ported member 35 assume the positions shown in Figure 2, although they are displaced or fluctuated somewhat in response to the pulsations of the milking machine or should the cow temporarily let up on her milking. This displacement is only a partial one and not sufficient to place the ports of the member 35 in open communication between the chambers 21 and 25. However, when the companion quarter of the cow's bag is milked out, the vacuum differential created in the unit is such that the top section 20 and the diaphragm 23 are jointly deflated to a position to displace the ported member 35 in its open position, thereupon causing a free flow of the fluid from the upper chamber into the lower chamber and a prompt and smart thrust of the diaphragm across the milk intake port 28 to shut off the vacuum to the teat cup and the subsequent dropping of the latter from the cow's teat. Thereafter, the lower chamber 24 is vented to the atmosphere through the vent passages 34, and the diaphragm 23, the top section 20 and the interposed ported member 35 are restored to their initial positions, the check valve 41 being opened at this time to cause the free flow of the fluid into the upper chamber.

We claim as our invention:

1. In a control device for milking machines, a body adapted to be interposed in a teat connection thereof and including a transverse partition defining upper and lower chambers with the upper chamber constituting a fluid-filled chamber, the lower chamber having a milk flow intake and discharge with the former terminating in a port opening into such lower chamber and the upper chamber having a normally-distended and deflatable flexible top wall, a normally-distended diaphragm in said lower chamber in contiguous relation to the opposing bottom side of said partition and adapted for deflation across said intake port and constituting a valve to close the same, a displaceable ported member guided in said partition between and in governed relation to said distendable top wall and said diaphragm, said partition having a port therein serving as a fluid by-pass between said upper chamber and that portion of the lower chamber above the diaphragm therein, and a check valve applied to said port.

2. In a control device for milking machines having teat connections, a body adapted to be interposed in a teat connection thereof and including a transverse partition having a concave bottom wall and defining upper and lower chambers, the lower chamber having a milk flow intake and discharge with the former terminating in a port opening into such lower chamber and the upper chamber constituting a fluid chamber and having a flexible dome-shaped distendable and deflatable top wall, a flexible diaphragm in said lower chamber in contiguous distended relation to the concave bottom wall of said partition in one position thereof and adapted for deflection across said intake port and constituting a valve to close the same, and a displaceable ported member guided in said partition between and in governed relation to said dome-shaped top wall and said diaphragm, said member being retained in its upper port-sealing position by said diaphragm when the same is in its distended position and being displaceable downwardly in response to deflation of such wall and a corresponding deflection of the diaphragm to a position to establish fluid flow communication between said upper chamber and the opposing portion of said lower chamber and the subsequent complete deflection of said diaphragm to its milk intake port closing position.

3. The combination with a milking machine of the pulsating type having teat connections for conducting the milk by vacuum from the cow to a milk-receiving can, of a control unit interposed in each teat connection and including a body having a transverse partition therein dividing the same into upper and lower compartments, the upper compartment constituting a fluid chamber having a deflatable top wall of pre-formed, substantially semi-spherical form and the lower compartment having a deflatable diaphragm therein of like form defining an upper chamber in opposing fluid communication with said fluid chamber and a lower chamber in milk flow communication with the companion teat connection and having a milk intake port governed by said diaphragm, and a displaceable ported member guided in said partition centrally of said compartments for controlling the flow of fluid between said opposing fluid chambers and interposed in governed relation between said deflatable top wall and said diaphragm.

4. The combination with a milking machine of the pulsating type having teat connections for conducting the milk by vacuum from the cow to a milk-receiving can, of a control unit interposed in each teat connection and including a hollow body having a transverse partition therein dividing the same into upper and lower compartments, the upper compartment constituting a fluid chamber having a deflatable top wall of pre-formed, substantially semi-spherical form and the lower compartment having a deflatable diaphragm therein of like form defining a lower chamber in milk flow communication with the companion teat connection and having a milk intake port governed by said diaphragm, and a stem-like displaceable member guided in said partition centrally of said compartments in normal venting relation thereto and interposed in governed relation between said deflatable top wall and said diaphragm, the upper portion of said member having longitudinal ports therein adapted to establish fluid flow communication between said upper compartment and that portion of the lower compartment above its diaphragm upon a partial deflation of the latter to cause a final complete deflation thereof across the milk intake port.

5. The combination with a milking machine of the pulsating type having teat connections for conducting the milk by vacuum from the cow to a milk-receiving can, of a control unit interposed in each teat connection and including a hollow body having a transverse partition therein dividing the same into upper and lower compartments, the upper compartment constituting a fluid chamber having a deflatable top wall of pre-formed, substantially semi-spherical form and the lower compartment having a deflatable diaphragm therein of like form defining a lower chamber in milk flow communication with the companion teat connection and having a milk intake port governed by said diaphragm, a stem-like displaceable member guided in said partition centrally of said compartments in venting relation thereto and interposed in governed relation between said deflatable top wall and said diaphragm, the upper portion of said member having longitudinal ports therein adapted to establish fluid flow communication between said upper compartment and that portion of the lower compartment above its diaphragm upon a partial deflation of the latter to cause a final complete deflation thereof across the milk intake port, said partition having a control port therein for the reverse flow of the fluid into said upper compartment, and a check valve applied to said port.

6. The combination with a milking machine of the pulsating type having teat connections for conducting the milk by vacuum from the cow to a milk-receiving can, of a control unit interposed in each teat connection and including a hollow body having a transverse partition therein dividing the same into upper and lower compartments, the upper compartment constituting a fluid chamber having a deflatable top wall of pre-formed, substantially semi-spherical form and the lower compartment having a deflatable diaphragm therein of like form defining a lower chamber in milk flow communication with the companion teat connection and having a milk intake port governed by said diaphragm, a stem-like displaceable member guided in said partition centrally of said compartments in venting relation thereto and interposed in governed relation between said deflatable top wall and said diaphragm, said member being in the form of a sleeve provided at its lower end with a fluid discharge port in abutting sealing relation to said diaphragm, and a spring connected to said displaceable member for urging it toward said diaphragm.

7. In a device of the character described, a chambered body composed of a lower section, an intermediate section and a flexible distendable and contractible top section forming a fluid chamber between it and said intermediate section, a displaceable diaphragm disposed between said lower and intermediate sections to divide the same into upper and lower chambers, the lower chamber being adapted for interflow communication with a liquid-conveying conduit under vacuum and having an intake port opening into said lower chamber and adapted to be closed by said diaphragm, and a displaceable ported means guided in said intermediate section in governed relation between said diaphragm and said contractible top section for establishing communication between said fluid chamber and the diaphragm-forming upper chamber.

8. In a device of the character described, a chambered body composed of a lower section, an intermediate section and a flexible distendable and contractible top section forming a fluid chamber between it and said intermediate section, a displaceable diaphragm disposed between said lower and intermediate sections to divide the same into upper and lower chambers, the lower chamber being adapted for interflow communication with a liquid-conveying conduit under vacuum and having an intake port opening into said lower chamber and adapted to be closed by said diaphragm, and a displaceable ported means guided in said intermediate section in governed relation between said diaphragm and said contractible top section for providing vent-like communication between said fluid chamber and the diaphragm-forming upper chamber during the initial portion of its displacement and for establishing full-ported communication between such chambers in response to its final displacement and that of said diaphragm toward port-closing position.

9. In a device of the character described, a chambered body composed of a lower section, an intermediate section having a concave bottom face and a distendable and contractible top wall of pre-formed, substantially semi-spherical shape forming a fluid chamber between it and said intermediate section, an axially-displaceable ported member guided in said intermediate section with its upper end in contact with said deflatable top wall for establishing a constant limited flow communication from and to said fluid chamber and for establishing a free flow communication when displaced downwardly from its upward position, and a deflatable diaphragm of pre-formed substantially semi-spherical shape disposed between and separating said lower and intermediate sections and in facial contact with the bottom face of such intermediate section and the opposing lower end of said ported member, said diaphragm and lower section providing a chamber for interflow communication with a liquid conveying conduit under vacuum and having an intake port therein adapted to be closed by said diaphragm when deflated.

10. In a device of the character described, a chambered body composed of a lower section, an intermediate section having a concave bottom face and a distendable and contractible top wall of pre-formed, substantially semi-spherical shape forming a fluid chamber between it and said intermediate section, an axially-displaceable ported member guided in said intermediate section with its upper end in contact with said deflatable top wall for establishing a constant limited flow communication from and to said fluid chamber and for establishing a free flow communication when displaced downwardly from its upward position, a deflatable diaphragm of pre-formed substantially semi-spherical shape disposed between and separating said lower and intermediate sections and in facial contact with the bottom face of such intermediate section and the opposing lower end of said ported member, said diaphragm and lower section providing a chamber for interflow communication with a liquid conveying conduit under vacuum and having an intake port therein adapted to be closed by said diaphragm when deflated, said intermediate section having a control port therein, and a check valve applied to said port.

11. In a control device for milking machines having teat connections, a chambered body including a transverse partition-forming section defining a lower portion in vacuum and milk flow communication with the teat connections thereof and including a milk flow port opening into the same and an upper portion forming a fluid chamber having a distendable and contractible flexible top wall, a diaphragm in said lower body portion adapted for deflation across said milk flow port to close the same in response to a change of vacuum in such lower body portion caused by a reduction of the flow of milk into the same, and a displaceable ported means guided in said partition-forming section and abutting at its upper and lower ends against said flexible top wall and said diaphragm for establishing, in certain positions, a constant limited fluid flow communication and in other positions thereof a free fluid flow communication between said upper chamber portion and the top surface of said diaphragm for causing, in such last-named positions of said ported means, the prompt deflation of the latter to its port-closing position.

12. In a control device for milking machines having teat connections, a body adapted to be interposed in a teat connection thereof and including a transverse partition defining upper and lower chambers with the upper chamber constituting a fluid-filled chamber, the lower chamber having a milk flow intake and discharge with the former terminating in a port opening into such lower chamber and the upper chamber having a flexible distendable and contractible top wall, a flexible diaphragm in said lower chamber in contiguous relation to the opposing bottom side of said partition and adapted for deflection across said intake port and constituting a valve to close the same, and a displaceable ported member guided in said partition between and in governed relation to said distendable top wall and said diaphragm.

ALBERT G. PERKINS.
WARREN E. PERKINS.

REFERENCES CITED

The following references are of record in the file of this patent:

UNITED STATES PATENTS

| Number | Name | Date |
|---|---|---|
| 1,183,080 | Kricke | May 16, 1916 |
| 2,445,904 | Bloemers | July 27, 1948 |

FOREIGN PATENTS

| Number | Country | Date |
|---|---|---|
| 53,077 | Sweden | Nov. 22, 1922 |